United States Patent [19]

Katayama et al.

[11] Patent Number: 5,109,509
[45] Date of Patent: Apr. 28, 1992

[54] SYSTEM FOR PROCESSING NATURAL LANGUAGE INCLUDING IDENTIFYING GRAMMATICAL RULE AND SEMANTIC CONCEPT OF AN UNDEFINED WORD

[75] Inventors: Yasunori Katayama, Mito; Kunio Nakanishi, Hitachi; Horishi Yoshiura, Kawasaki; Kotaro Hirasawa, Hitachi, all of Japan

[73] Assignee: Hitachi, Ltd., Tokyo, Japan

[21] Appl. No.: 277,526

[22] Filed: Nov. 28, 1988

Related U.S. Application Data

[63] Continuation of Ser. No. 792,270, Oct. 28, 1985, abandoned.

[30] Foreign Application Priority Data

Oct. 29, 1984 [JP] Japan ............... 59-227251

[51] Int. Cl.⁵ .................. G06F 15/38
[52] U.S. Cl. ................... 395/600; 364/226.4; 364/920.4; 364/943.42; 364/943.5; 364/DIG. 2; 364/419
[58] Field of Search ... 364/200 MS File, 900 MS File, 364/419

[56] References Cited

U.S. PATENT DOCUMENTS

| | | | |
|---|---|---|---|
| 4,164,025 | 8/1979 | Dubnowski et al. | 364/900 |
| 4,193,119 | 3/1980 | Arase et al. | 400/110 |
| 4,460,973 | 3/1982 | Tanimoto et al. | 364/900 |
| 4,468,756 | 8/1984 | Chan | 400/110 |
| 4,502,128 | 2/1985 | Okajima et al. | 364/900 |
| 4,509,137 | 4/1985 | Yoshida | 364/419 |
| 4,531,119 | 7/1985 | Nakayama et al. | 340/711 |
| 4,543,631 | 9/1985 | Kurosu et al. | 364/200 |
| 4,544,276 | 10/1985 | Horodeck | 400/110 |
| 4,586,160 | 4/1986 | Amano et al. | 364/900 |
| 4,623,985 | 11/1986 | Morimoto et al. | 364/900 |
| 4,641,264 | 2/1987 | Nitta et al. | 364/900 |
| 4,661,924 | 4/1987 | Okamoto et al. | 364/900 |

FOREIGN PATENT DOCUMENTS

| | | | |
|---|---|---|---|
| 2014765 | 8/1979 | United Kingdom | 364/513.5 |
| 1596411 | 8/1981 | United Kingdom . | |
| 2122782 | 1/1984 | United Kingdom . | |

OTHER PUBLICATIONS

Uchida et al., "ATLAS: Automatic Translation System", Fujiutsu Scientific and Technical Journal, Jul. 21, 1985, pp. 317-329.

*Primary Examiner*—Thomas C. Lee
*Assistant Examiner*—Ayni Mohamed
*Attorney, Agent, or Firm*—Antonelli, Terry, Stout & Kraus

[57] ABSTRACT

A natural language including Japanese, Korean, Chinese, etc., is suitably processed when an undefined word which is not registered in a dictionary appears in an input character train. When the undefined word appears, a semantic analysis processor decides a semantic concept of the undefined word by using a case dictionary. Further, by using a vocabulary hierarchy dictionary, which registers vocabularies in a hierarchy structure, the semantic analysis processor extracts a group of vocabularies (synonyms) corresponding to a lower concept of the semantic concept of the undefined word. The natural language processing can be achieved practically and efficiently with dictionaries of a limited storage capacity.

4 Claims, 12 Drawing Sheets

FIG. 2A

ミギシタノバショニクウハクイキヲサクセイシタイ
(mi gi shi ta no ba sho ni ku u ha ku i ki wo sa ku se i shi ta i)
(WISH TO DRAW UP A BLANK AREA AT THE LOWER RIGHT PLACE)

FIG. 2B

```
┌ミギシター/ノ/バ/ショ─ニ┐─ク   (ku)
│ (mi gi shi ta-no-ba sho—ni)│  ク/ウ         (ku u)
│ ミギ/キ                    │  ク/ウ/ハ       (ku u ha)
│ (mi gi)                    │  ク/ウ/ハ/ク    (ku u ha ku)
│                            │  ク/ウ/ハ/ク/イ  (ku u ha ku i)
│                            └  ク/ウ/ハ/ク/イ/キ (ku u ha ku i ki)
```

ヲ┌サクセイシ─タイ.
 │(wo)│(sa ku se i shi—ta i)
     │ サ/ク  (sa ku)
     └ (sa ku)

FIG. 2C

右下/の/場所/に/クウハクイキ/を/作成し/たい.
[LOWER RIGHT / OF / PLACE / AT / BLANK AREA / / DRAW UP / WISH]
(NOWN) (CASE (NOWN) (CASE                   (CASE    (AUXILIARY
        PARTICLE)    PARTICLE)              PARTICLE)   VERB)
                                         (サ(sa)
                                         COLUMN
                                         IRREGULAR
                                         CONJUGATION VERB
                                         CONTINUATIVE FORM)

FIG. 8

只今入力した
(tadaima nyuryoku shita)
"クウハクイキ"
"ku u ha ku i ki"
という単語は辞書に有りません．
(to iu tango wa jisyo ni arimasen)
類似のものを下記から選択して下さい
(ruiji no mono wo kaki kara sentaku shite kudasai)
(THE VOCABULARY SUCH AS "ku u ha ku i ki" WHICH HAS BEEN JUST INPUTTED DOES NOT EXIST IN THE DICTIONARY. PLEASE SELECT A SIMILAR ONE FROM THE FOLLOWING.)

(1) WINDOW         (2) DOCUMENT (3) FIGURE         (4) BLANK (5) FRAME          (6) PAGE (7) POINT          (8) CURSOR (9) CHARACTER

FIG. 11

KNOWLEDGE BASE (FUNCTION MEMORY) 220

| ADDRESS | VERB | COMMAND NAME | PRECONDITION | GOAL |
|---|---|---|---|---|
| $ 0001 | (DRAW UP (KIND(ACTION))) | (SPACE (KIND (COMMAND))) | (*PLACE NAME (EXIST (SENTENCE))) | (*PLACE NAME (EXIST (BLANK))) |
| $ 0002 | (DRAW UP (KIND (ACTION))) | (DRAW FIGURE (KIND (COMMAND))) | (*PLACE NAME (EXIST (BLANK))) | (*PLACE NAME (EXIST (FIGURE))) |
| ----- | ----- | ----- | ----- | ----- |

SYSTEM FOR PROCESSING NATURAL LANGUAGE INCLUDING IDENTIFYING GRAMMATICAL RULE AND SEMANTIC CONCEPT OF AN UNDEFINED WORD

This application is a part continuation of application Ser. No. 06/792,270, filed Oct. 28, 1985, now abandoned

BACKGROUND OF THE INVENTION

The present invention relates to a method and apparatus for processing a natural language such as Japanese, Korean, Chinese, etc., and in particular, to a method and apparatus for natural language processing suitable for processing sentences which contain vocabularies not registered in a dictionary (hereinafter referred to as undefined words).

In performing sophisticated processing of a natural language, generally, syntax analysis of a sentence is carried out, and based on the analysis, composition and editing of a new sentence are performed. However, in order to achieve the natural language processing, all vocabularies possible to compose a sentence are not always registered in a dictionary entirely, and thus even when a large dictionary is made available, undefined words which are not registered in the dictionary frequently appear in the sentence in many cases.

A technique to solve this problem is disclosed in Japanese patent unexamined publication Nos. 58-175074 (1983), 58-175075 (1983) and 58-175076. In the technique disclosed in these publications, for an undefined word occurring as a result of failure in consulting a dictionary, the user is requested to input a synonym included in the words which have been registered and existing in the dictionary, and depending on this user's response, information for syntax analysis is added.

However, in this technique, it is necessary for the user to memorize beforehand synonyms, etc., registered in the dictionary, or it is necessary for the system to output a list of all vocabularies registered in the dictionary so that the user himself extracts a synonym or the like from the list. Accordingly, in the case of a sophisticated processing, the number of registered words increases, and the burden on the user increases remarkably, and thus it has been difficult to carry out the natural language processing in a simple manner and effectively.

In view of the problems mentioned above, an object of the present invention is to provide a method and apparatus for natural language processing which is capable of performing a sophisticated and practical natural language processing in that even when an undefined word appears in a sentence to be processed, the user is provided with information of a synonym from the apparatus to enable the processing with a dictionary of a limited storage capacity.

SUMMARY OF THE INVENTION

In the present invention, when an undefined word appears in an input character train of a natural language, an upper concept of the undefined word is obtained by a semantic analysis processor which determines a semantic concept of the vocabulary by using a case dictionary, then, using a vocabulary hierarchy dictionary which registers vocabularies in a hierarchy structure formed according to the upper concept, a group of vocabularies corresponding to a lower concept are extracted. Further, it is also a feature of the invention in which the extracted group of vocabularies are displayed on a display device and the user is enabled to select a synonym from the group.

Another feature of the invention resides in that when an undefined word appears in an input character train of a natural language, an upper concept of the undefined word is obtained by the semantic analysis processor which determines a semantic concept of a vocabulary by using a case dictionary, then, by using a vocabulary hierarchy dictionary which registers vocabularies in a hierarchy structure formed according to the upper concept, a group of vocabularies corresponding to alower concept are extracted, and a synonym is selected, by an inference device which selects from the extracted group of vocabularies of the lower concept a vocabulary by inference, of which vocabulary is in conformity with the intention of the inputted character train, and then the undefined word is replaced by the selected synonym.

BRIEF DESCRIPTION OF THE DRAWINGS

FIGS. 2A to 2C show an example of an input sentence;

FIG. 8 shows an example of display of a synonym;

FIG. 11 shows an example of a knowledge base (function memory); and

DESCRIPTION OF THE PREFERRED EMBODIMENTS

An embodiment of the present invention will be described with reference to the drawings.

Figure 1:
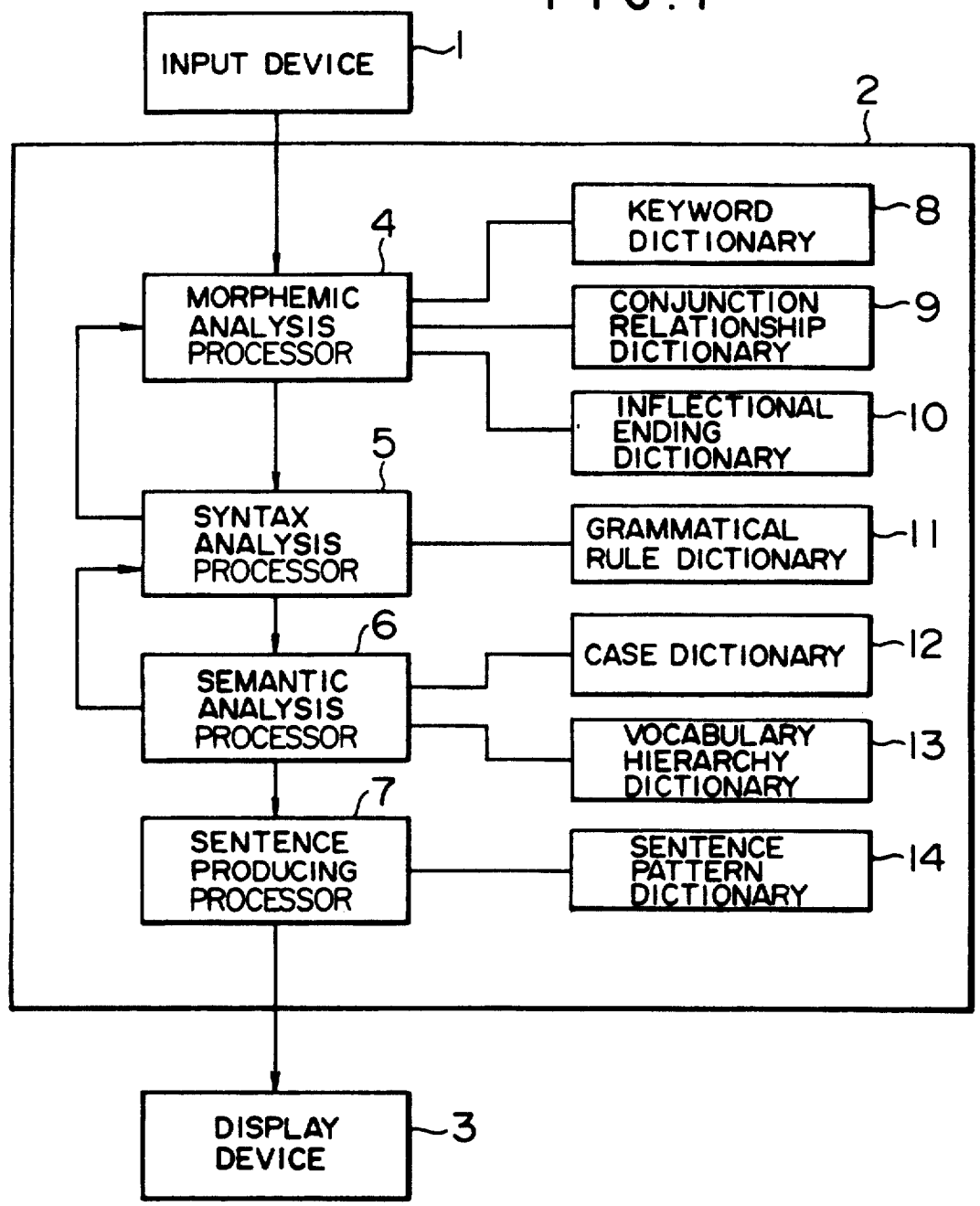
FIG. 1 is a block diagram of an overall arrangement in accordance with an embodiment of the present invention.

FIG. 1 shows an overall arrangement of the invention, that is, shows an intelligent guidance system of the question-answer type in which the user inputs by means of an input device 1 (e.g., a keyboard, voice recognition device, hand-written character input device, etc.) a natural language (e.g., Japanese) into a processing unit 2, and the processing unit 2 executes processing as regards the natural language and provides the user with information by displaying the contents and results of the processing on a display device 3. The processing unit 2 is composed of a keyword dictionary 8, a conjunction relationship dictionary 9, an inflectional ending dictionary 10, and morphemic analysis means 4 for dividing an input sentence into vocabularies by use of information of the dictionaries 8 to 10; a grammatical rule dictionary 11, and syntax analysis processor 5 for obtaining a syntax of the input sentence by use of the dictionary 11 (which will be described below); a case dictionary 12, a vocabulary hierarchy dictionary 13, and semantic analysis processor 6 for extracting a meaning of the input sentence by use of the dictionaries 12 and 13; a sentence pattern dictionary 14 containing several patterns of answer sentences, and sentence producing means 7 for producing a sentence by use of this dictionary 14.

Next, individual processings in the processing unit 2 will be described in detail by way of an example in which, as shown in FIG. 2A, a sentence in kana characters (Japanese syllabary) in solid writings:

ミ ギ シ タ ノ バ ショ ニ ク ウ ハ ク イ キ
(mi gi shi ta no ba sho ni ku u ha ku i ki)
[wish to draw up a blank area at the lower right place]

ヲ サ ク セ イ シ タ イ．
(wo sa ku se i shi ta i)

is inputted as an input sentence.

(1) Morphemic Analysis

First, in the morphenic analysis, by using the keyword dictionary 8, conjunction relationship dictionary 9, and inflectional ending dictionary 10, it is determined whether or not a keyword exists in the character train of the input sentence, and a conjunction relationship is checked, and then the input sentence is divided into vocabularies. Here, in Tables 1, 2, and 3, examples of the keyword dictionary 8, conjunction relationship dictionary 9, and inflectional ending dictionary 10 are respectively shown.

TABLE 1

Keyword Dictionary

| address | keyword | part of speech | conjuction condition forward | backward |
|---|---|---|---|---|
| 0001 | サクセイ(スル) (sa ku se i (su ru)) | iregular conjugation verb inflected in サ(sa) column | α2 | γ1 |
| 0002 | シタ (shi ta) | noun | α1 | β1 |
| 0003 | タイ (ta i) | auxiliary verb | α3 | β3 |
| 0004 | ニ (ni) | case particle | α4 | β4 |
| 0005 | ノ (no) | case particle | α4 | β4 |
| 0006 | バショ (ba sho) | noun | α1 | β1 |
| 0007 | ミギ (mi gi) | noun | α1 | β1 |
| 0008 | ミギシタ (mi gi shi ta) | noun | α1 | β1 |

TABLE 1-continued

Keyword Dictionary

| address | keyword | part of speech | conjuction condition forward | backward |
|---|---|---|---|---|
| 0009 | ヲ (wo) | case particle | α4 | β4 |

TABLE 2

Conjunction Relationship Dictionary

| beginning of sentence | β1 | β2 | β3 | β4 | β5 | β6 | ... |
|---|---|---|---|---|---|---|---|
| α1 | 1 | 0 | 0 | . | . | . | |
| α2 | 1 | | | . | . | . | |
| α3 | 0 | | | ... | ... | 0 | 1 |
| α4 | 0 | | | | | | |
| ending of sentence | | | | | | | |

TABLE 3

Inflectional Ending Dictionary

| | negative form | continuative form | conclusive form | attributive form | conditional form | imperative form |
|---|---|---|---|---|---|---|
| | β5 | β6 | β7 | β8 | β9 | β10 |
| γ1 irregular conjugation in サ(sa) column | シ (shi) | シ (shi) | スル (su ru) | スル (su ru) | スレ (su re) | セ (se) | dictionary 9, and inflectional ending dictionary 10 are respectively shown.

In the keyword dictionary 8, there are registered with addresses, keywords, parts of speech, and conjunction conditions, and in particular, in the conjunction conditions, there are registered with forward and backward conjunction relationships of each keyword. Further, in the conjunction relationship dictionary 9, there are registered with correspondences between the conjunction relationships of each keyword mentioned above. For example, when a vocabulary having a forward conjunction condition of α3 and another vocabulary having a backward conjunction condition of β6 are able to be connected with each other, then this relationship is registered as "1". The inflectional ending dictionary 10 is used to register beforehand the endings of each keyword corresponding to conjugations of the keyword since the keyword conjugates when it is a verb. In this respect, in the keyword dictionary 8, when a keyword (e.g., サクセイ (スル) ; (sa ku se i (su ru)); [to draw up]) is the word which conjugates, the backward conjunction relationship is registered as γ1 so that the inflectional ending dictionary 10 can be used in looking up immediately.

Figure 3:
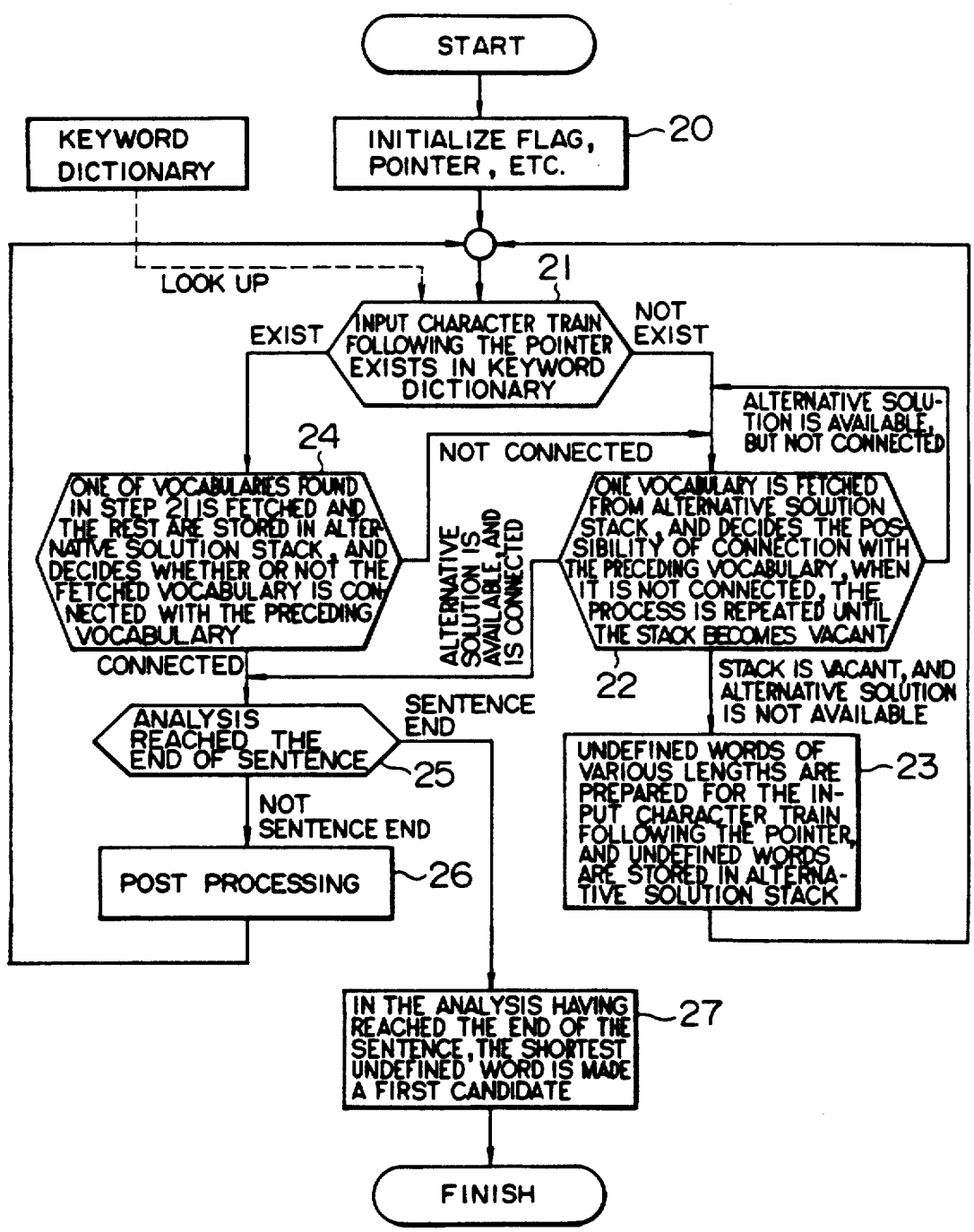
FIG. 3 is a flowchart for explaining a processing procedure of morphemic analysis means.

With reference to FIG. 3, the processing procedure of the morphemic analysis processor 4 will be described. First, in step 20, flag, pointer, stack, etc., required for the subsequent processing are initialized. Next, in step 21, it is decided from a pointer of the input character train whether or not a character train following the pointer exists in the keyword dictionary 8, and when the result of the decision indicates that a keyword exists, the process proceeds to step 24. Otherwise, the process proceeds to step 22. When the keyword does not exist, in step 22, one vocabulary is fetched from an alternative solution stack, and it is decided whether or not the fetched vocabulary can be connected with a vocabulary before the fetched one. Here, when the fetched vocabulary is not connected to the preceding vocabulary, and if the stack for alternative solutions is vacant, the process proceeds to step 23, and undefined words of various lengths are prepared for the input character train following the pointer under the assumption that any one of the undefined words corresponds to the input character train, and after storing these undefined words in the alternative solution stack, the process returns to the processing of the character train following the pointer in step 21. When the fetched vocabulary is not connected with the preceding vocabulary, and if alternative solutions are available in the alternative solution stack, the process in step 22 is again tried for the alternative solutions.

In step 21, when the keyword exists, the process proceeds to step 24, and the longest one of the vocabularies found in step 21 is fetched and the rest are stored in the alternative solution stack. Further it is checked by using the conjunction relationship dictionary 9 whether or not the fetched vocabulary is connected with a vocabulary appearing just before the fetched vocabulary in the input sentence. When the connection is possible, the process proceeds to step 25 and decides whether or not the analysis has progressed to the end of the sentence, whereas when the connection is not possible, the process in step 22 is executed. Further, in step 22, when there is an alternative solution and the connection with the preceding vocabulary is possible, the process proceeds to step 25.

In step 25, when the analysis has not reached the end of the sentence, the process in step 26 is executed, and a post processing for updating the pointer and flag is executed, and returns to step 21. On the other hand, in step 25, when the analysis has reached the end of the sentence, the process proceeds to step 27, and when undefined words exist in the analysis which has reached the end of the sentence, the shortest one among the undefined words is selected as a first candidate, and the morphemic analysis is completed. Further, in steps 22 and 24, in the case of checking the possibility of connection, it is supposed that the undefined word can be connected with any vocabulary.

Next, the morphemic analysis which is to be carried out when the sentence shown in FIG. 2A as an example is inputted will be described. When the sentence is inputted to the morphemic analysis means 4, in the initializing step 20, by looking up in the keyword dictionary of Table 1 a vocabulary in which the pointer is located at the beginning of the sentence, i.e., a position of "ミ" (mi) of ミギシタ..(mi gi shi ta...) and the vocabulary begins with "ミ" (mi), "ミギ" (mi gi) (address 0007) and "ミギシタ" (mi gi shi ta) (address 0008) in the keyword dictionary of Table 1 are obtained. Then, by applying a rule (the longest coincidence rule) based on the experimental rule that the longest vocabulary has the highest probability of being correctly punctuated, "ミギシタ" (mi gi shi ta) is obtained. In step 21, a forward conjunction condition of α1 is obtained, and in step 24, from the conjunction relationship dictionary of Table 2, data at the intersection of the beginning of the sentence and the conjunction condition of α1 is fetched. Here, the data at the intersection is "1", and since the conjunction condition is met, in step 26 via step 25, the pointer of the post processing indicates "ノ" (no) in "ノバショ" (no ba sho). Returning to step 21, by looking up in the keyword dictionary (Table 1), a case particle "ノ" (no) at address 0005 is obtained. In the course of further processing in the similar way, although the sentence can be divided into vocabularies until "ニ" (ni), the processing is deadlocked at "ク" (ku). After the deadlock, in steps 22 and 23, undefined words are determined in such a manner as "ク" (ku), "クウ" (ku u), "クウハ" (ku u ha), "クウハ..." (ku u ha...), and these undefined words are stored in the alternative solution stack, and first, "ク" (ku) is selected as an undefined word, and cutting out of a vocabulary is tried for "ウハ.." (u ha ...), and results in a failure. Then, by selecting "クウ" (ku u) as an undefined word, the division into vocabularies is further tried as to the sentence following the "クウ" (ku u), which also results in a failure. In this manner, after fetching an undefined word of "クウハクイキ" (ku u ha ku i ki), the process proceeds to step 25, the cutting out of vocabularies thus reaches the end of the sentence and vocabularies of undefined words can be cut out as shown in FIG. 2B.

Here, a method of using the inflectional ending dictionary in Table 3 will be described hereinafter. Specifically, at the time when the vocabulary of "サクセイ" (sa ku se i) [draw up]is cut out in step 21, it is determined that this vocabulary is an irregular conjugation verb whose ending is inflected in the "サ" (sa) column in the Japanese syllabary, and as an inflectional ending, two kinds of word's endings including "シ" (shi) of the negative form and "シ" (shi) of the continuative form in Table 3 are obtained as candidates. At this time, since it is impossible to determine which one is to be adopted, these two candidates are stored in the stack, and at the time in which the next vocabulary of "タイ" (ta i) is cut out, the intersection of a forward conjunction condition α3 of "タイ" (ta i) and a backward conjunction condition β5 of the "シ" (shi) of the negative form is obtained from the conjunction relationship dictionary in Table 2; since the intersection is "0", it is determined that the negative form does not satisfy the conjunction condition. On the other hand, as to the "シ" (shi) of the continuative form, since the intersection of a backward conjunction condition β6 of "シ" (shi) of the continuative form and the forward conjunction condition α3 is "1" in the conjunction relationship dictionary in Table 2, it is found that "サクセイシ" (sa ku se i shi) is the continuative form and an auxiliary verb of "タイ" (ta i) expressing a wish is connected.

As a result of such cutting out, a character train of vocabularies is obtained as shown in FIG. 2C, and "クウハクイキ" (ku u ha ku i ki) is obtained as an undefined word.

(2) Syntax Analysis

The character train obtained in the morphemic analysis processor 4 is the input to the next processing in the syntax analysis processor 5. The syntax analysis processor 5 executes a processing which determines a grammatical rule applicable by using the grammatical rule dictionary 11, and determine with which role in the grammatical rule the inputted vocabulary is burdened.

Here, an example of the grammatical rule dictionary 11 is shown in Table 4.

TABLE 4

| | Grammatical Rule Dictionary | |
|---|---|---|
| No. of Rule | Left Side | Right Side |
| 1 | sentence | clause + "end mark" |
| 2 | clause | predicate |
| 3 | clause | adverb phrase |
| 4 | clause | noun phase + clause |
| 5 | noun phrase | noun + particle |
| 6 | noun phrase | clause + noun phrase |
| 7 | clause | noun + |
| . | . | . |
| . | . | . |

The grammatical rule dictionary 11 registers systemitized grammatical rules, and for example, as a result of the morphemic analysis, when " ミギシタ " (mi gi shi ta) and " ノ " (no) are cut out, these resultant vocabularies correspond to a rule of No. 5. The right side is determined to be noun+particle and the left side is determined to be a noun phrase.

Figure 4:
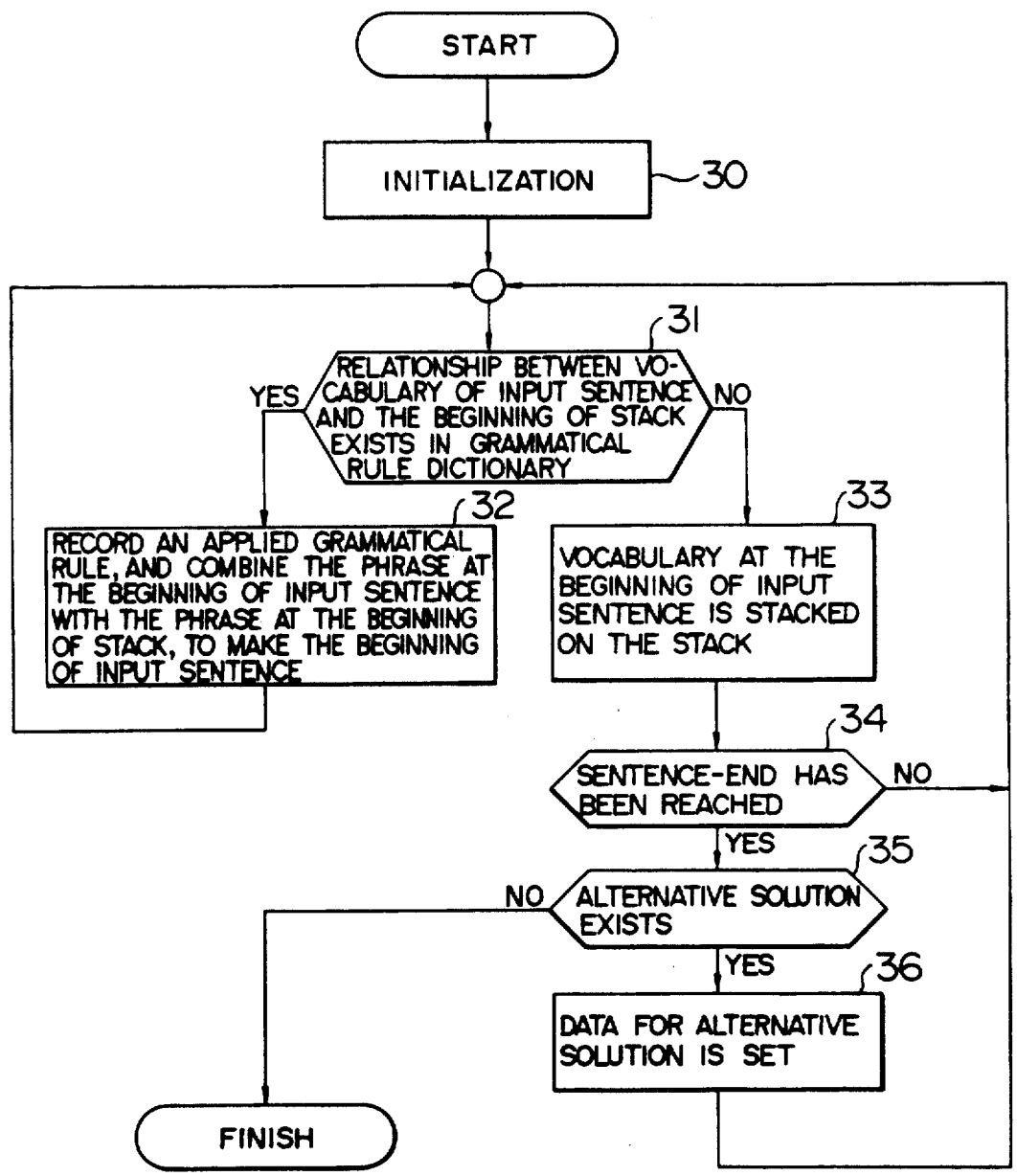
FIG. 4 is a flowchart for explaining a processing procedure of syntax analysis means.

With reference to FIG. 4, the processing procedure of the syntax analysis processor 5 will be described. First, in step 30, a variable, stack, etc., required for the syntax analysis are initialized.

Next, in step 31, a grammatical relationship which is identical with the one between a phrase at the beginning of the stack and grammatical information (exists in the keyword dictionary 8) of a vocabulary at the beginning of the input sentence, is searched from the right side of the grammatical rule dictionary 11 shown in Table 4, and it is decided whether or not a rule corresponding to that grammatical relationship exists. When the rule exists in the dictionary 11, step 32 is executed, and when the rule does not exist in the dictionary 11, step 33 is executed. In the case in which the rule exists in the dictionary 11, the process proceeds to step 32, and when a plurality of rules are found, these rules are stored in data for alternative solutions, and by using one rule from these rules, the phrase at the beginning of the stack is combined with the beginning of the input sentence, and by assigning the grammatical condition to the left side of the grammatical rule, the combination is made as a vocabulary (phrase in this case) at the beginning of the input sentence. However, when there is an undefined word, since it is impossible to determine the grammatical condition of the undefined word, it is supposed that the undefined word can be connected with any vocabulary. When the rule does not exist in the dictionary, in step 33, a processing to stack the phrase at the beginning of the input sentence is executed, and in step 34, it is decided whether or not the input sentence after stacking on the stack has reached the end of the sentence, and when the end of the sentence has not yet been reached, the processing in step 31 is executed, whereas when the sentence-end has been reached, the processing in step 35 is executed. In step 35, it is decided whether or not an alternative solution exists in the processing in step 31, and when the alternative solution exists, the process proceeds to step 36, and when the alternative solution does not exist, the syntax analysis is completed. In the step 36, one of the candidates of alternative solution are stored in step 32, and data obtained as a result of the analysis conducted up to step 31 are set. This enables to continue the processing subsequent to the processing in which the candidates for alternative solutions have been found.

Next, an example of operation for this processing will be described. As an input sentence, the sentence as shown in FIG. 2B and additional grammatical information are inputted. Since the stack is vacant at first, steps 31 and 33 are executed, and "ミギシタ" (mi gi shi ta) is stored in the stack. Next, in step 31, a conjunction relationship between " ノ " (no) and "ミギシタ" (mi gi shi ta) in the input sentence is consulted with the grammatical rule dictionary in Table 4, and it is found that noun+particle in the right side in rule No. 5 is applicable, and thus these portions of the input sentence are stored in the stack as one noun phrase. Next, since "バショ" (ba sho) is not connected with the aforementioned noun phrase, the noun "バショ" (ba sho) is stacked on the stack.

Supposing that "バショ" (ba sho) and "ニ" (ni) constitute a noun phrase, and the undefined word of " クウハクイキ " (ku u ha ku i ki) is a noun, it is found that " クウハクイキ " (ku u ha ku i ki) and "ヲ" (wo) constitute a noun phrase, and " サクセイシタイ " (sa ku sei shi ta i) is a predicate, and that by applying the left side of rule No. 2, these portions of the input sentence constitute a clause. Further, from rule No. 4, since noun phrase+clause (right side) is clause (left side), it is decided that " クウハクイキ " " ヲ " " サクセイシタイ " (ku u ha ku i ki) (wo) (sa ku se i shi ta i) is a clause. In this manner, by analyzing until the end of the input sentence is reached, it is found in accordance with clause+"end mark" in rule No. 1 that the input sentence is a grammatical or meaning sentence, and the analysis is successful.

(3) Semantic Analysis

Based on the result of the syntax analysis, the semantic analysis processor 6 obtains an upper or superior concept of the undefined word from a grammatical condition by using the case dictionary 12, and further performs a semantic analysis by using the vocabulary hierarchy dictionary 13 in which the upper concept is further formed in a hierarchy structure.

Figure 5:
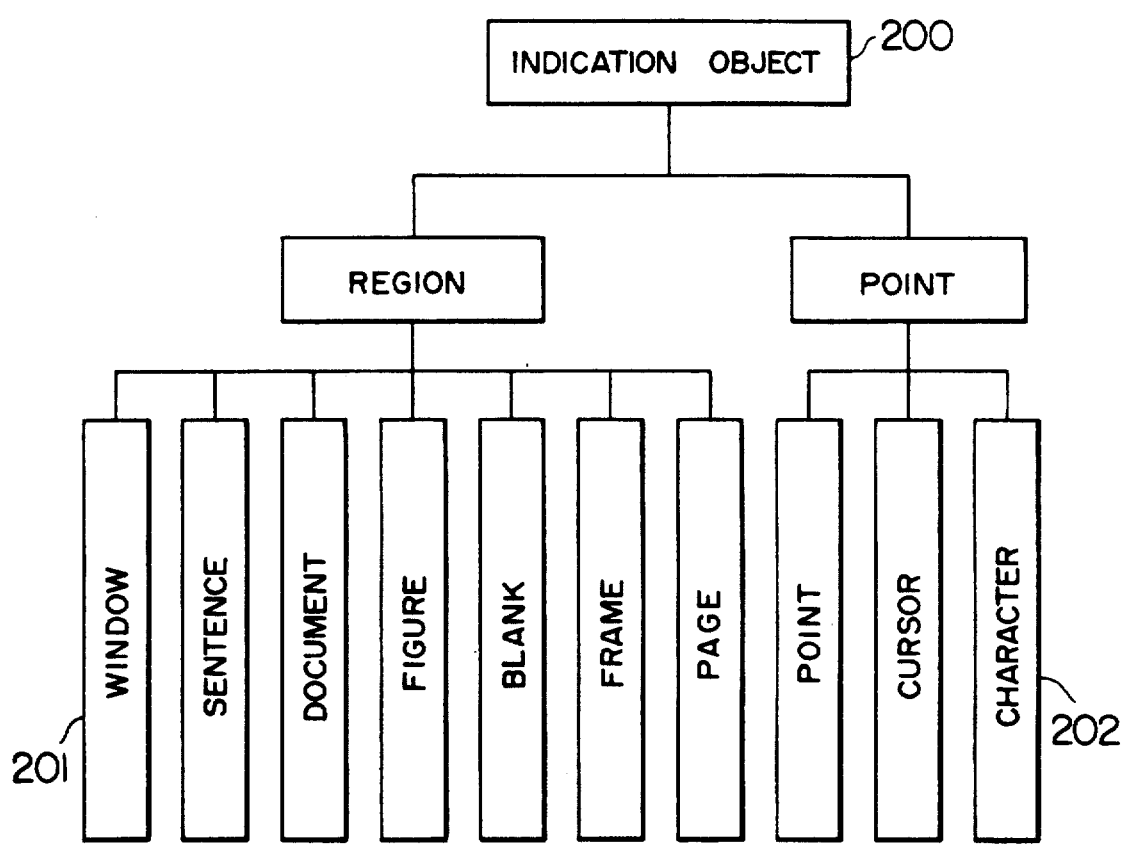
FIG. 5 shows an example of a vocabulary hierarchy dictionary.

Here, an example of the case dictionary 12 is shown in Table 5, and an example of the vocabulary hierarchy dictionary 13 is shown in FIG. 5.

TABLE 5

| Case Dictionary | | | |
|---|---|---|---|
| 作成する (sa ku se i su ru) [draw up] | | | |
| | grammatical condition | semantic condition | |
| | | concept | default value |
| subject of action | noun + ガ(ga) | animal | user |
| place | noun + ニ(ni) | position | — |
| objective case | noun + ヲ(wo) | indication object | — |
| priority | | 1 | |

The case dictionary 12 registers a semantic concept in a corresponding relationship with the grammatical condition of a vocabulary (in this case, " 作成する " (sakuseisuro) [draw up]). For example, when "noun+-ガ(ga)" is being connected with "作成する" (sakuseisuru), according to this dictionary, it can be understood that the noun represents an animal as its concept. Here, the default value is intended to mean a value which is applied to an omittable item (which will be described later) in the course of the semantic analysis. Further, in the vocabulary hierarchy dictionary 13 shown in FIG. 5, there are registered with vocabularies of a lower concept in a hierarchy structure whose upper concept is the concept in the case dictionary 12.

Figure 6:
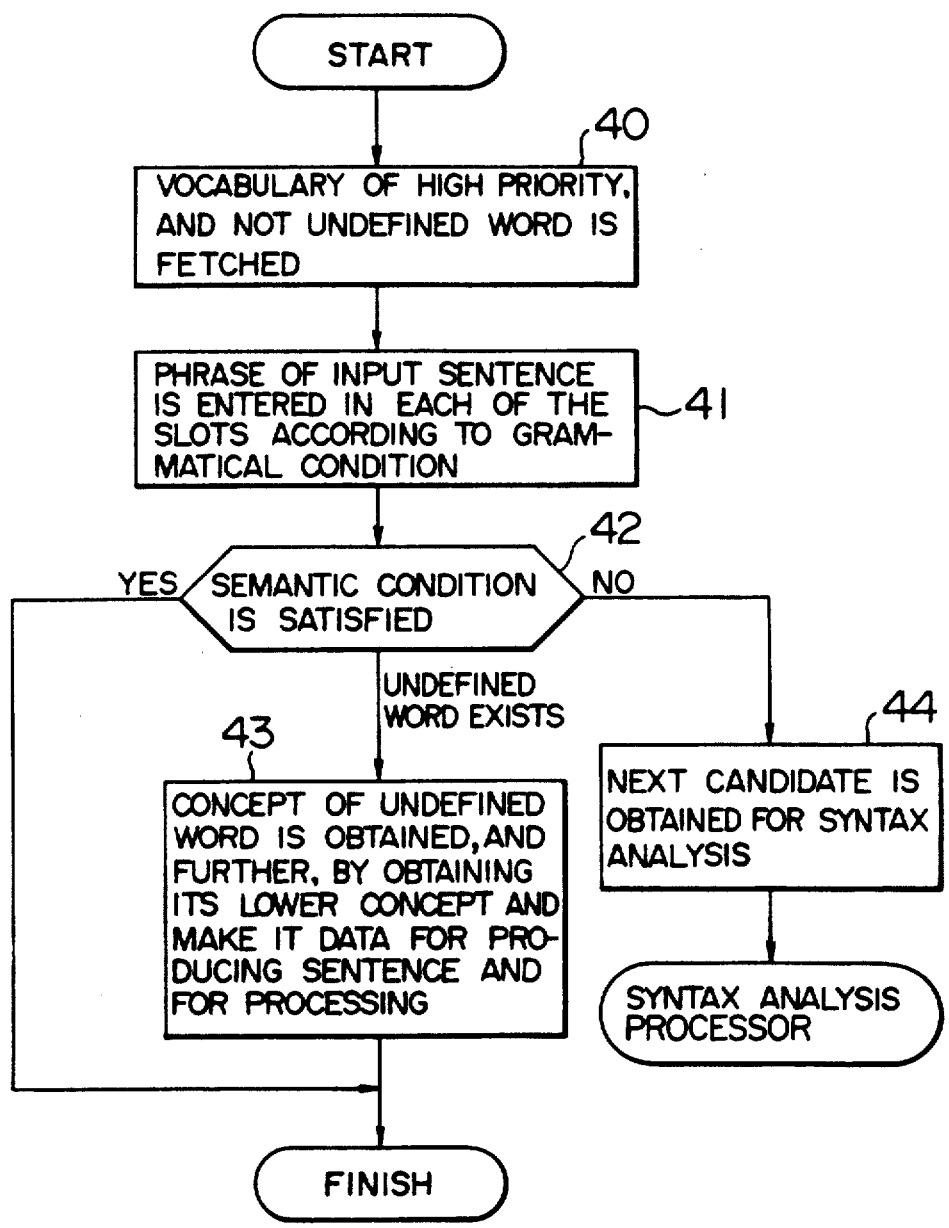
FIG. 6 is a flowchart for explaining a processing procedure of semantic analysis means.

With reference to FIG. 6, a processing procedure of the semantic analysis processor 6 will be described. First, in step 40, from the output of the syntax analysis processor 5, a vocabulary (e.g., a verb constituting a predicate) of a highest priority is taken out with the exception of an undefined word, and information of the vocabulary is obtained by using the case dictionary 12 as shown in Table 5.

Next, in step 41, from phrases in the input sentence, a phrase which satisfies the grammatical condition of the vocabulary obtained in step 40 is selected, and the selected phrase is substituted in a slot (a concept enclosed in a block in FIG. 7) of a syntax tree. In step 42, it is checked whether or not the completed syntax tree satisfies the semantic condition. When an undefined word exists, the process proceeds to step 43, when the semantic condition is not satisfied, the process proceeds to step 44, and in other cases, the process returns. In step 43, a concept of the slot in which the undefined word is to be entered is obtained, and its lower or subordinate concept is obtained from the vocabulary hierarchy dictionary 13 in order to to be used as data for producing a sentence. In step 44, the processing is programmed to obtain an alternative solution of the syntax analysis, when the semantic analysis is not successful.

Figure 7:
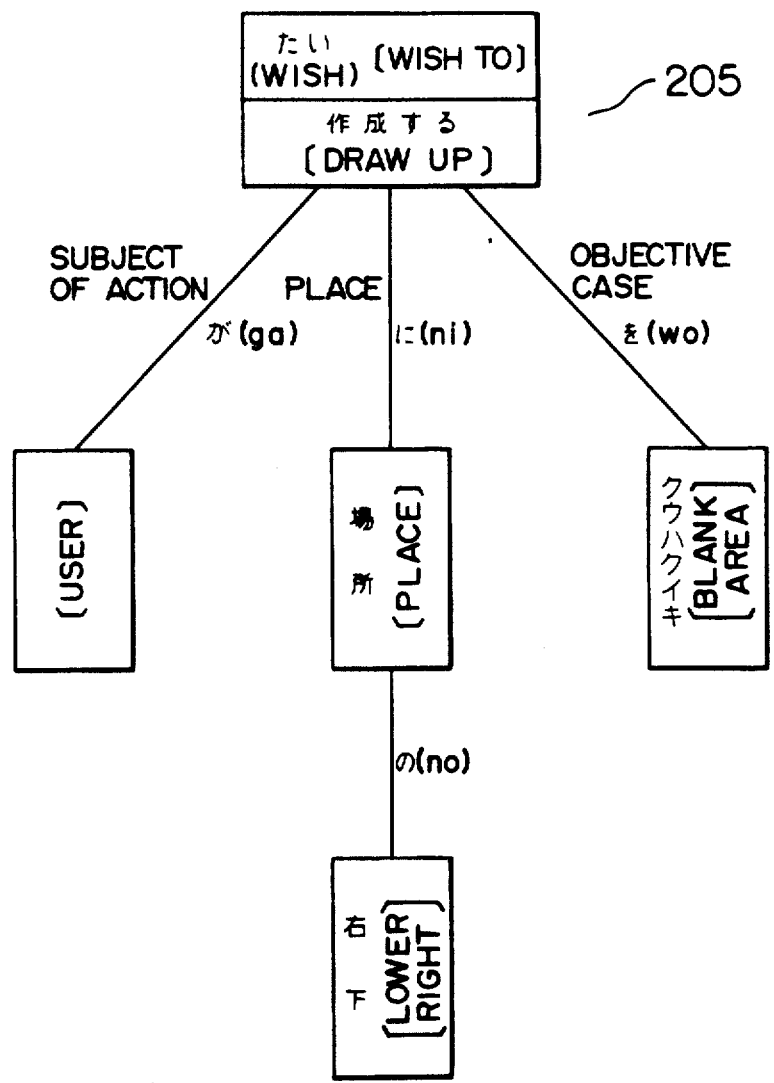
FIG. 7 shows an example of a syntax tree.

This operation will be described as regards the example used in the previous description. In step 40, it is made clear that the verb constituting the predicate is "作成する" (sakuseisuru) [draw up], and the case dictionary in Table 5 is fetched. A phrase corresponding to an item of the grammatical rule of the case dictionary is fetched from the output of the syntax analysis processor 5, and this phrase is applied to the item. For example, since a phrase "noun+が(ga)" corresponding to the subject of action is not found in the sentence, it is assumed that this phrase is omitted, and applies "ユーザ" (u za) of the default value. Next, it is found that the place case is an indispensable case which can not be omitted, and that this place case corresponds to words and phrases " 右下の場所 " (migishita no basho) place at the lower right]+ニ" (ni), and that its objective case is " クウハクイキ " (ku u ha ku i ki)+"を" (wo) Next, in step 42, it is determined whether " 右下の場所に " (migishita no basho ni) represents a place. In this case, the semantic condition for representing a position is satisfied. Since " クウハクイキ " (ku u ha ku i ki) is an undefined word, the semantic condition is not satisfied. However, it is also determined that for a semantic condition to be satisfied, it is required that the semantic condition be a concept of "indication object". FIG. 5 is an example of the hierarchy structure of a vocabulary formed by putting such concept in order, and it is seen that " クウハクイキ " (ku u ha ku i ki) is a lower concept of the "indication object" or upper concept 200, and is a kind of "window 201" "character 202". A syntax tree formed in this manner is shown in FIG. 7.

(4) Sentence Production

The sentence producing processor 7, based on the result of the semantic analysis processor 6, calls a question pattern of the undefined word from the sentence pattern dictionary 14, and fills the question pattern with vocabularies of the hierarchy structure obtained by the semantic analysis processor 6, and displays it as a question sentence as shown in FIG. 8, and enables the user to select a synonym.

When the user selects the synonym, the system proceeds with the analysis further by using various information of the synonym in the dictionary.

By virtue of such an arrangement, even when the sentence as shown in FIG. 2A is inputted, the undefined word of " クウハクイキ " (ku u ha ku i ki) is fetched as a vocabulary, and the user is enabled to select a synonym from the vocabularies displayed on the display device 3 as shown in FIG. 8. When the user inputs a vocabulary of "余白" [blank], the system proceeds with subsequent analysis by using various kinds of information of the vocabulary of "余白" [blank].

In the prior art, when it is not clear whether or not a synonym exists, a vocabulary is entered, and when there is no synonym, another vocabulary had to be entered. However, in the present invention, vocabularies which belong to the concept of the undefined word are displayed, and these vocabularies are displayed without fail if synonyms thereof are registered in the dictionary. Accordingly, the system is very easy for the user to use.

Figure 9:
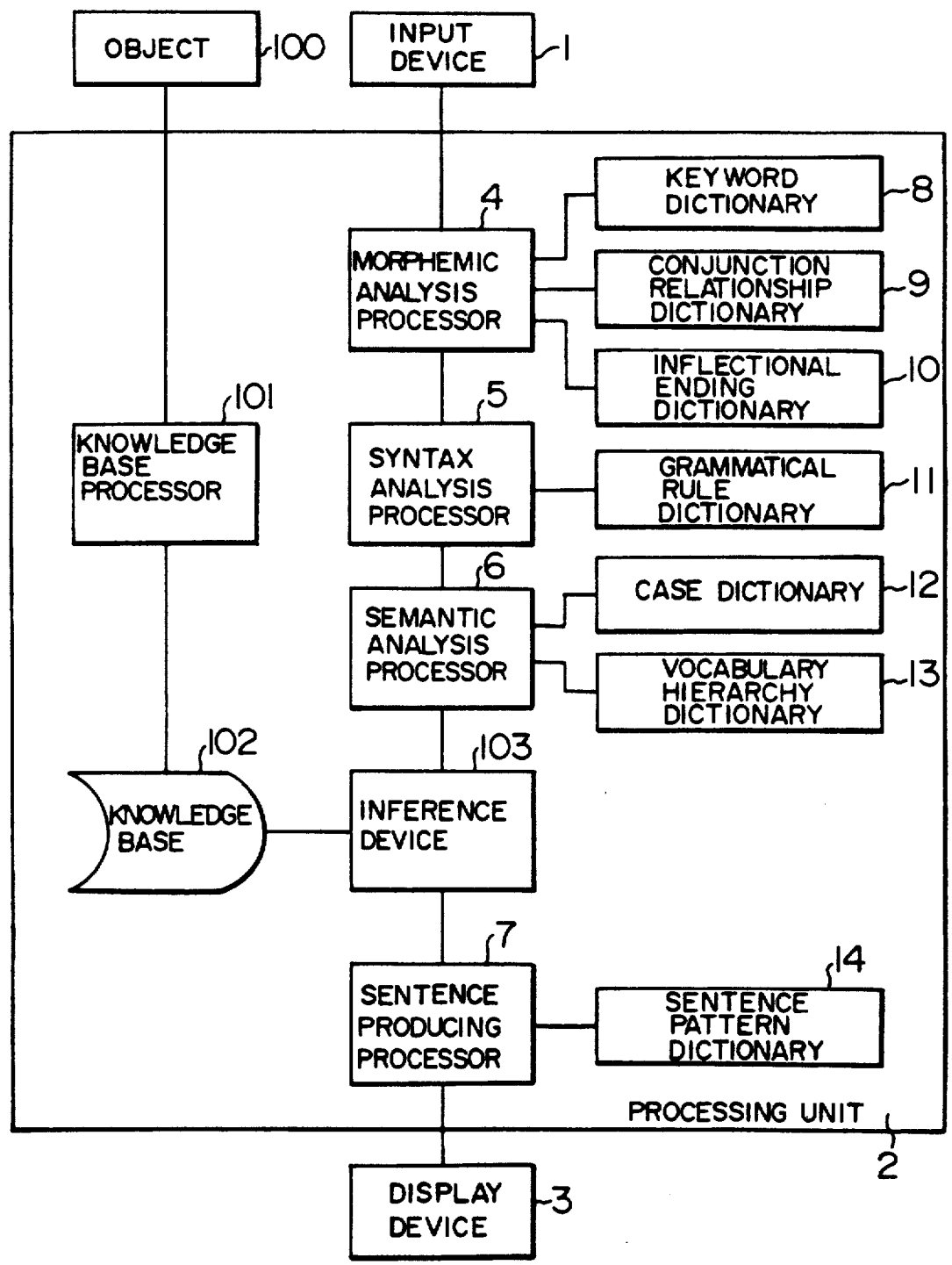
FIG. 9 is a block diagram of an overall arrangement in accordance with another embodiment of the present invention.

Next, another embodiment of the present invention will be described with reference to FIGS. 9 to 12. Differences in this embodiment from that shown in FIG. 1 reside in that as shown in FIG. 9, an object 100, knowledge base processor 101, knowledge base 102, and an inference device 103 are added. Here, the object 100 serves to restrict a theme, and information is stored in the knowledge base 102 following on a variation in status, through the knowledge base processor 101 which produces and updates the knowledge base 102. On the other hand, in the inference device 103, the syntax tree 205 (FIG. 7) which is the output of the semantic analysis processor 6 mentioned in the previous embodiment is inputted, and by looking up in the knowledge base 102, a synonym of the undefined word is automatically substituted and displayed for the user.

Here, as an example of the object 100, a processing of a natural language as regards an "information terminal system" will be described. Here, the "information terminal system" means an apparatus which includes an interface which deals with information between a human and a computer. Thus, in the example of the language processing which will be described hereinafter, in conducting the inference by using the knowledge base, the object of a theme is restricted to a concrete operation method or processing method of the "information terminal system". Naturally, in the present invention, the object 100 is not limited to the "information terminal system", but the natural language processing is possible for other objects of themes.

Figure 10A:
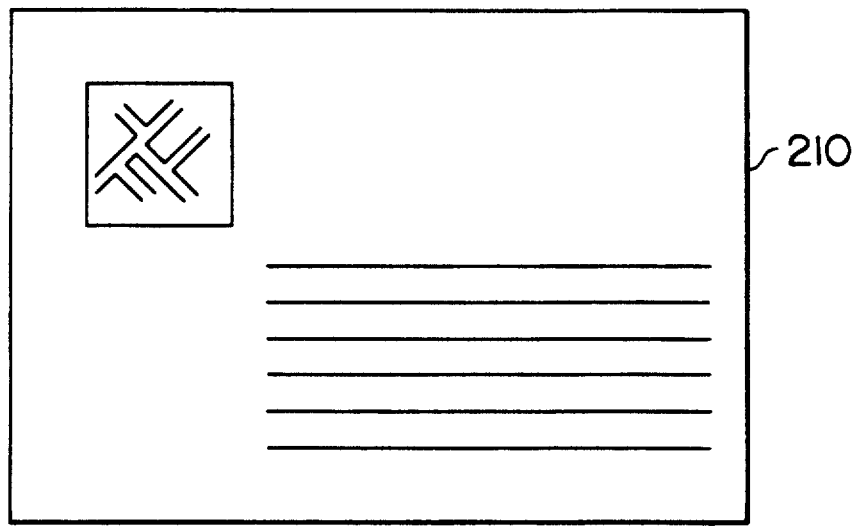
FIGS. 10A and 10B show respectively an example of a picture screen status of an information terminal and an example of representation of a knowledge base (status memory)
Figure 10B:
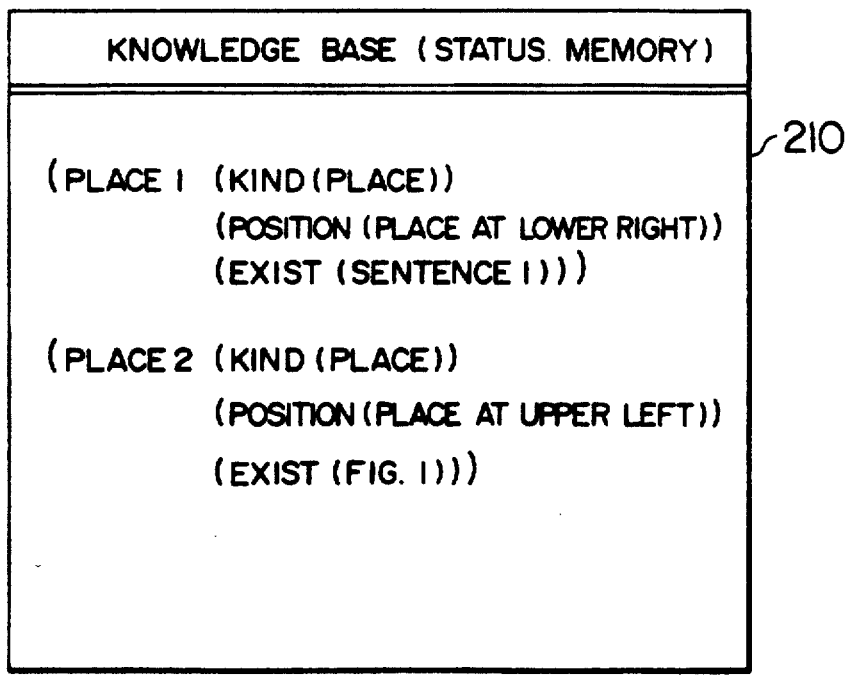

In the knowledge base processor 101 connected with the information terminal on line, as a method of representing its knowledge base 102, various representations are available such as predicate logic, frame, and the like. For example, here, in representing a status of the picture screen 210 of the information terminal as shown in FIG. 10A, if the picture screen status is represented as shown in FIG. 10B, the knowledge base processor 101 actually performs a data conversion processing for converting an internal representation of the information terminal to a knowledge base description type. Here, in FIG. 10B, it is represented to mean that information given a name "place 1" belongs to a kind of place, and its position is at the lower right place, and a sentence given a name "sentence 1" exists at the place. Similarly, "place 2" represents information of a kind of place, and its position is at upper left place, and a figure given a name "FIG. 1" exists.

Such information is represented so that the content of the picture screen display is varied each time the user manipulates the information terminal, and for example, it is arranged that when the figure at the upper left in FIG. 10A is erased, the items of (place 2 ( . . . ) . . . ) in FIG. 10B disappear.

On the other hand, in the knowledge base 102, in addition to the information (a set of such information is called a status memory) which varies following a status change of the information terminal as described above and shown in FIG. 10B, a function memory 220 which expresses the functions of the information terminal as shown in FIG. 11 is included. This function memory is composed of, for each address, ① verb, ② command name, ③ precondition, and ④ goal. In the ② command name, in view of the fact that the status of the information terminal is varied each time a key is manipulated, a command name corresponding to the manipulation is stored. In the ③ precondition, a status of the information terminal which is the premise required to execute the key manipulation is stored. In the ④ goal, a new status produced after the execution of the key manipulation is stored. And in the ① verb, verbs (each verb and its synonyms, etc., are collected in a group, and included in an upper concept or the like) in the input sentence are stored, and each verb is made to correspond to the ② command name which is the action representing the key manipulation in the input sentence.

Further, the representation method of the knowledge base is hereinafter referred to as a frame. Since the function memory of the knowledge base provides a general representation, names having a mark # attached thereto are variables, and when correspondences of these variables with the input sentence and the status memory of the knowledge base are established, the variables are bound with respective constants with which the correspondences have been established.

Figure 12:
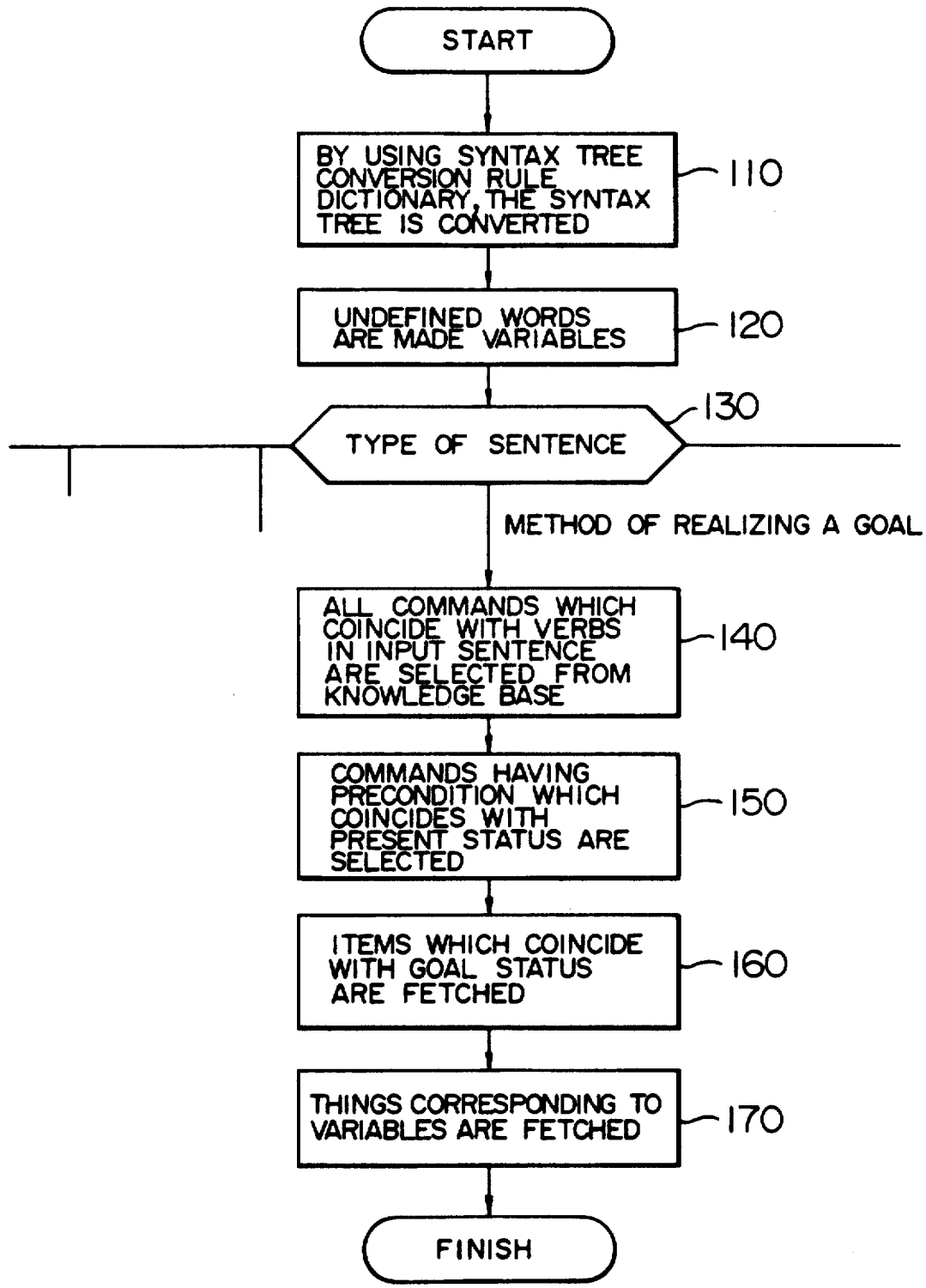
FIG. 12 is a flowchart for explaining a processing procedure in accordance with another embodiment of the present invention.

When executing the processing described in the foregoing embodiment, the output of the semantic analysis is the syntax tree (FIG. 7). Upon receipt of this syntax tree, the inference means 103 executes a processing as shown in FIG. 12.

Here, since the syntax tree which is the output of the semantic analysis processor 6 differs from the frame representation describing the knowledge base, a syntax tree conversion rule dictionary (not sown in figure) shown in Table 6, and a sentence type determination dictionary (not shown in figure) shown in Table 7 are used.

TABLE 6

| Syntax Tree Conversion Rule Dictionary | |
|---|---|
| draw up | |
| syntax tree | frame structure |
| (draw up | (draw up (kind (meaning))) |
| (branch 1 . (subject of action)) | (place (exist objective case))) |
| (branch 2 (place)) | |
| (branch 3 (objective case))) | |

TABLE 7

| Sentence Type Determination Dictionary | |
|---|---|
| sentence-end of input sentence | sentence type |
| (wish) | HOW type |
| (dou naru ka) | RESULT type |
| (suru houhou ka) | HOW type |
| . | . |
| . | . |
| . | . |

In the processing procedure shown in FIG. 12, in step 110, by using the syntax tree conversion rule dictionary shown in Table 6, the syntax tree is converted to the frame representation, and in step 120, undefined words in this frame are made variables.

Next, from the syntax tree in FIG. 7, since it is understood that this sentence is a wish, that is, a question as to an operation method of the information terminal, in step 130, by using this information and the sentence type determination dictionary shown in Table 7, the sentence type is decided and proceeds to step 140. In step 140, from the verbs in the input sentence, all commands which coincide with these verbs are selected from the knowledge base. In order to execute these commands, in step 150, a matching between the precondition which has to be satisfied by the information terminal and the status of the information terminal is executed, and also a binding of the variables is executed, and commands which have passed the matching are selected.

In step 160, the goal status of the selected commands is matched with the content of the syntax tree, and the binding of the variables is executed, and items which coincide with the goal status are fetched. In step 170, the results of the binding between the variable and the constant (e.g., place 1, FIG. 1, sentence 1, etc.,) executed in steps 150 and 160 are fetched. Before entering the main processing, since it can not be determined what the undefined words indicate, the undefined words have been regarded as variables, however, as a result of the execution in step 170, the constant which has been bound to the variable of the undefined word becomes a synonym of the undefined word.

The method of matching and binding of variables is described in detail in LISP by Patrick H. Winston & Berthold K. P. Horn (Addison-Wesley Publishing Company, Inc., Reading, Mass., U.S.A.).

This processing will be described by way of an example. The syntax tree in FIG. 7 is a logical sum of (作成する [draw up] (kind (action))) and (に下の情報 [place at lower right] (exist (クウハクエリア (ku u ha ku i ki) [blank area]))), and it is converted in accordance with the syntax tree conversion rule dictionary in Table 6 in steps 110 and 120. Here, the mark # indicates that the attached word is a variable. From the sentence type determination dictionary in Table 7, it is found that the type of the sentence is a HOW type (a sentence which states a goal status and inquiries a means for realizing the goal) as determined from an auxiliary verb of the wish. When searching from the knowledge base (function memory) of FIG. 11, a verb of the first item of the frame in step 120, of which verb means 作成する [draw up](kind (action))), the matching is established with the "space" command and "draw figure" command. Next, matching is tried between the status memory (this is also included in the knowledge base) of FIG. 10B which being the present status and the precondition. When the "place at lower right" is substituted for the '# place name' in the precondition, it becomes clear in step 150 that the matching with the "space" command is successful whereas the matching with the "draw figure" command is not successful. Step 160 is executed to obtain matching between the status directly represented by the input sentence, i.e., '左下の場所 [place at lower right] ( 在 [exist] (# クウハクイキ (ku u ha ku i ki) [blank . area]))) and ( 右下の場所 place at lower right] ( 在 [exist] ( 余白 [blank]))) obtained in step 150 by substituting the value of the variable for the goal in FIG. 11, and # クウハクイキ (ku u ha ku i ki) [blank area] and 余白 [blank] are bound. As a result, it is found that " クウハクイキ "(ku u ha ku i ki) [blank area] is a synonym of " 余白 " (yohaku) [blank]. In the sentence producing means 7, it is displayed for the user that " クウハクイキ " (ku u ha ku i ki) should be interpreted by replacing it by " '余白' " [blank].

In this embodiment of the present invention, it is shown that a synonym is made automatically selectable.

In this embodiment, although the description is made in connection with the "information terminal system", it will be apparent from the embodiment that the present invention is applicable not only to the "information terminal system" but to other systems.

According to the present invention, even when the undefined word appears, information of the synonym is extracted and provided for the user. Thus, the user is not required to store all synonyms, and it is possible to achieve the natural language processing with a dictionary having a limited storage capacity, making processing practical and efficient.

We claim:

1. A natural language processing apparatus for processing a natural language character train, said processing apparatus comprising:
   a keyword dictionary for storing keywords;
   a conjunction relation dictionary for storing conjunction relationships of keywords stored in said keyword dictionary;
   morphemic analysis means including (a) means for receiving an inputted character train including defined words and undefined words; (b) means for comparing the character train with keywords in said keyword dictionary to identify an undefined word in the character train; (c) means for comparing the character train with the contents of said conjunction relation dictionary to determine the conjunction relationship of the identified undefined word; and (d) means for dividing the inputted character train into vocabularies;
   a grammatical rule dictionary for storing grammatical rules related to the natural language;
   syntax analysis means for determining whether a conjunction of the vocabularies is in conformity with a predetermined grammatical rule stored in said grammatical rule dictionary;
   a case dictionary for storing semantic concepts corresponding with the natural language, including superior concepts and subordinate concepts, the semantic concepts being in conformity with the predetermined grammatical rule;
   semantic analysis means responsive to the semantic concepts stored in said case dictionary for identifying a semantic concept of the identified undefined word, said semantic analysis means including (a) a vocabulary hierarchy dictionary for storing vocabularies classified in a hierarchal order from a superior concept to a subordinate concept in accordance with a semantic concept of the vocabularies stored in said case dictionary, and (b) means for extracting from said hierarchy dictionary a group of vocabularies corresponding to a subordinate concept of the semantic concept of the undefined word; and
   a display device for displaying the extracted group of vocabularies to permit selection by an operator of a synonym of the undefined word.

2. A natural language processing apparatus for processing a natural language character train, said processing apparatus comprising:
   a keyword dictionary for storing keywords;
   a conjunction relation dictionary for storing conjunction relationships of keywords stored in said keyword dictionary;
   morphemic analysis means including (a) means for receiving an inputted character train including defined words and undefined words; (b) means for comparing the character train with keywords in said keyword dictionary to identify an undefined word in the character train; (c) means for comparing the character train with the contents of said conjunction relation dictionary to determine the conjunction relationship of the identified undefined word; and (d) means for dividing the inputted character train into vocabularies;
   a grammatical rule dictionary for storing grammatical rules related to the natural language;
   syntax analysis means for determining whether a conjunction of the vocabularies is in conformity with a predetermined grammatical rule stored in said grammatical rule dictionary;
   a case dictionary for storing semantic concepts corresponding with the natural language, including superior concepts and subordinate concepts, the semantic concepts being in conformity with the predetermined grammatical rule;
   semantic analysis means responsive to the semantic concepts stored in said case dictionary for identifying a semantic concept in the outlet of said syntax analysis means, including a semantic concept of the identified undefined word, said semantic analysis means including (a) a vocabulary hierarchy dictionary for storing vocabularies classified in a hierarchal order from a superior concept to a subordinate concept in accordance with a semantic concept of the vocabularies stored in said case dictionary, and (b) means for extracting from said hierarchy dictionary a group of vocabularies corresponding to a subordinate concept of the semantic concept of the undefined word; and
   inference means for selecting from the extracted group of vocabularies a synonym to replace the undefined word in conformity with the inputted character train.

3. A method for processing a natural language by extracting an undefined word from an input character train, comprising the steps of:
   receiving an input character train including an undefined word;
   dividing the received input character train into vocabularies;
   determining whether a conjunction of the vocabularies is in conformity with a predetermined grammatical rule;

identifying a semantic concept of the undefined word by using a case dictionary which stored semantic concepts between vocabularies, the stored semantic concepts including superior concepts and subordinate concepts and being in conformity with the predetermined grammatical rule;

extracting from a vocabulary hierarchy dictionary, which stores vocabularies in a hierarchal order from a superior concept to a subordinate concept, a group of vocabularies corresponding to a subordinate concept of the identified semantic concept of the undefined word; and selecting from the extracted group of vocabularies a synonym for the undefined word.

4. A method of processing a natural language character train, including an undefined word, said method comprising the steps of:

receiving an input character train having a conjunctional relationship and including defined words and undefined words;

dividing the received character train into words;

identifying a grammatical rule with which the conjunctional relationship of the received character train is in conformity;

applying the identified grammatical rule to a case dictionary storing semantic concepts to identify a semantic concept of the undefined word;

extracting from a vocabulary hierarchal dictionary a vocabulary of words corresponding to a subordinate concept of the identified semantic concept; and selecting synonyms of the undefined word from the extracted vocabulary.

* * * * *